US007311623B2

(12) United States Patent
Masuda et al.

(10) Patent No.: US 7,311,623 B2
(45) Date of Patent: Dec. 25, 2007

(54) ENGINE INCORPORATING A V-BELT TYPE CONTINUOUSLY VARIABLE TRANSMISSION

(75) Inventors: Tatsuya Masuda, Iwata (JP); Yousuke Ishida, Iwata (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 11/305,353

(22) Filed: Dec. 16, 2005

(65) Prior Publication Data
US 2006/0128510 A1 Jun. 15, 2006

Related U.S. Application Data

(63) Continuation of application No. PCT/JP04/06330, filed on Jun. 14, 2004.

(30) Foreign Application Priority Data
Jun. 16, 2003 (JP) ............................ 2003-171065

(51) Int. Cl.
*F16H 55/56* (2006.01)
(52) U.S. Cl. .......................................................... 474/8
(58) Field of Classification Search .................... 474/8, 474/18, 28; 74/606 R
See application file for complete search history.

(56) References Cited

U.S. PATENT DOCUMENTS
6,941,918 B2* 9/2005 Laimboeck ............. 123/195 R

FOREIGN PATENT DOCUMENTS

| JP | 56854/1991 | 5/1991 |
|----|-----------|--------|
| JP | 5-213263 A | 8/1993 |
| JP | 08-151927 | 6/1996 |
| JP | 2001-065650 | 3/2001 |
| JP | 2002-068070 | 3/2002 |

* cited by examiner

Primary Examiner—Vicky A. Johnson
(74) Attorney, Agent, or Firm—Knobbe, Martens, Olson & Bear, LLP

(57) ABSTRACT

An engine has a continuously variable transmission in which a drive pulley is attached to an end of a crankshaft. The drive pulley is coupled by a flexible transmitter to a driven pulley. The driven pulley is attached to an end of a transmission shaft. A centrifugal clutch mechanism is axially aligned with the transmission shaft. The centrifugal clutch is positioned inboard of the driven pulley. A case supports the crankshaft and the transmission shaft. The case comprises a first case portion and a second case portion that are joined along a plane that is positioned between the driven pulley and a longitudinal plane that intersects an axis of a cylinder of the engine.

17 Claims, 5 Drawing Sheets

ENGINE INCORPORATING A V-BELT TYPE CONTINUOUSLY VARIABLE TRANSMISSION

CROSS-REFERENCE TO RELATED APPLICATIONS

This application is a continuation of PCT Application No. PCT/JP2004/008330, filed on Jun. 14, 2004, which claimed the priority of Japanese Patent Application No. 2003-171065, which was filed on Jun. 16, 2003, both of which are hereby incorporated by reference in their entirety.

BACKGROUND OF THE INVENTION

1. Field of the Invention

The present invention generally relates to an engine with a V-belt type continuously variable transmission.

2. Description of the Related Art

Vehicles have used engines coupled to continuously variable transmissions for years. Over the years, there have been various constructions that address different perceived problems with the prior constructions. Most of the constructions feature a drive pulley attached to the crankshaft and a driven pulley attached to a transmission shaft. The two pulleys are connected by a V-belt or the like.

Often, the crankcase of the associated engine is split into a left portion and a right portion. The two portions are joined at a surface that extends generally perpendicular to the crankshaft. The location at which the two portions are joined typically is offset to one side of the cylinder axis or the other such that an intake port associated with the cylinder is formed in only one of the two portions. Such a construction is easier to manufacture because the intake port portion would have to be carefully aligned if the two portions each contained a part of the intake port. Such an engine is shown in, for example, JP-A-8-151927. In this arrangement, however, the clutch mechanism is positioned such that it is difficult, if not impossible to employ a wet-type of clutch. Thus, the benefits of the wet-type clutch are denied.

Engines also have been coupled with continuously variable transmissions that are integrally designed with the engine. In such combinations, a right portion and a left portion of the casing can be joined together using bolts. The combination casing contains a crankshaft, a drive pulley shaft, a transmission pulley shaft of the V-belt type continuously variable transmission, and an output shaft for outputting the power to the rear wheel, which can be arranged in parallel with one another. The engine incorporating this type of V-belt continuously variable transmission realizes a narrow configuration even though the engine features a V-belt type continuously variable transmission. Such a construction can be found, for example, in JP-A-2001-65650. In such a configuration, however, the driven pulley and the clutch both have relatively large diameters and are provided on separate axes. Therefore, the engine case must be enlarged to accommodate both, making it difficult to reduce the size of the engine case.

In one other configuration, a centrifugal clutch mechanism is positioned between an engine and a drive shaft of a continuously variable transmission. The power transmitted into the continuously variable transmission through the clutch is then transmitted to a sub-gear transmission. In this engine, a driven gear is press-fit to the drive shaft of the sub-gear transmission and the driven gear meshes with the drive gear of the counter-shaft of the sub-gear transmission. The tolerance between the driven gear and the drive shaft preferably is set so that slipping can occur between the driven gear and the drive shaft when a predetermined torque is exceeded. Such a configuration is devised to reduce the likelihood of drive train failure while featuring a fairly simple structure using fewer parts, having a lower cost and having a lower weight. This configuration is shown, for example, in JP-A-2002-68070. The arrangement illustrated therein, however features a clutch that is positioned between the crankshaft and the drive pulley, which expands the transmission chamber laterally outward. The expansion makes a compact configuration difficult.

SUMMARY OF THE INVENTION

Accordingly, one aspect of the present invention involves an engine and continuously variable transmission combination that has a relatively small size while it maintains a high degree of reliability and durability.

Another aspect of the present invention involves an engine and continuously variable transmission combination. The combination comprises a case and a cylinder that extends away from the case. The cylinder comprises an axial direction with a first longitudinal plane extending through the axial direction. The case supports a crankshaft and a transmission shaft. The case also comprises a first portion and a second portion. The first portion and the second portion are joined along a second longitudinal plane that is generally parallel to the first longitudinal plane. A drive pulley is attached to a first end of the crankshaft. The drive pulley is coupled with a flexible transmitter to a driven pulley. The driven pulley is attached to a first end of the transmission shaft. A clutch mechanism is generally axially aligned with the transmission shaft. The clutch mechanism is positioned toward the first longitudinal plane relative to the driven pulley and the first longitudinal plane is positioned between the second longitudinal plane and the driven pulley.

BRIEF DESCRIPTION OF THE DRAWINGS

These and other features, aspects and advantages of the present invention will now be described with reference to the drawings of a preferred embodiment of the present invention, which embodiment is intended to illustrate and not to limit the invention, and in which figures.

DETAILED DESCRIPTION OF THE PREFERRED EMBODIMENT

Figure 1:
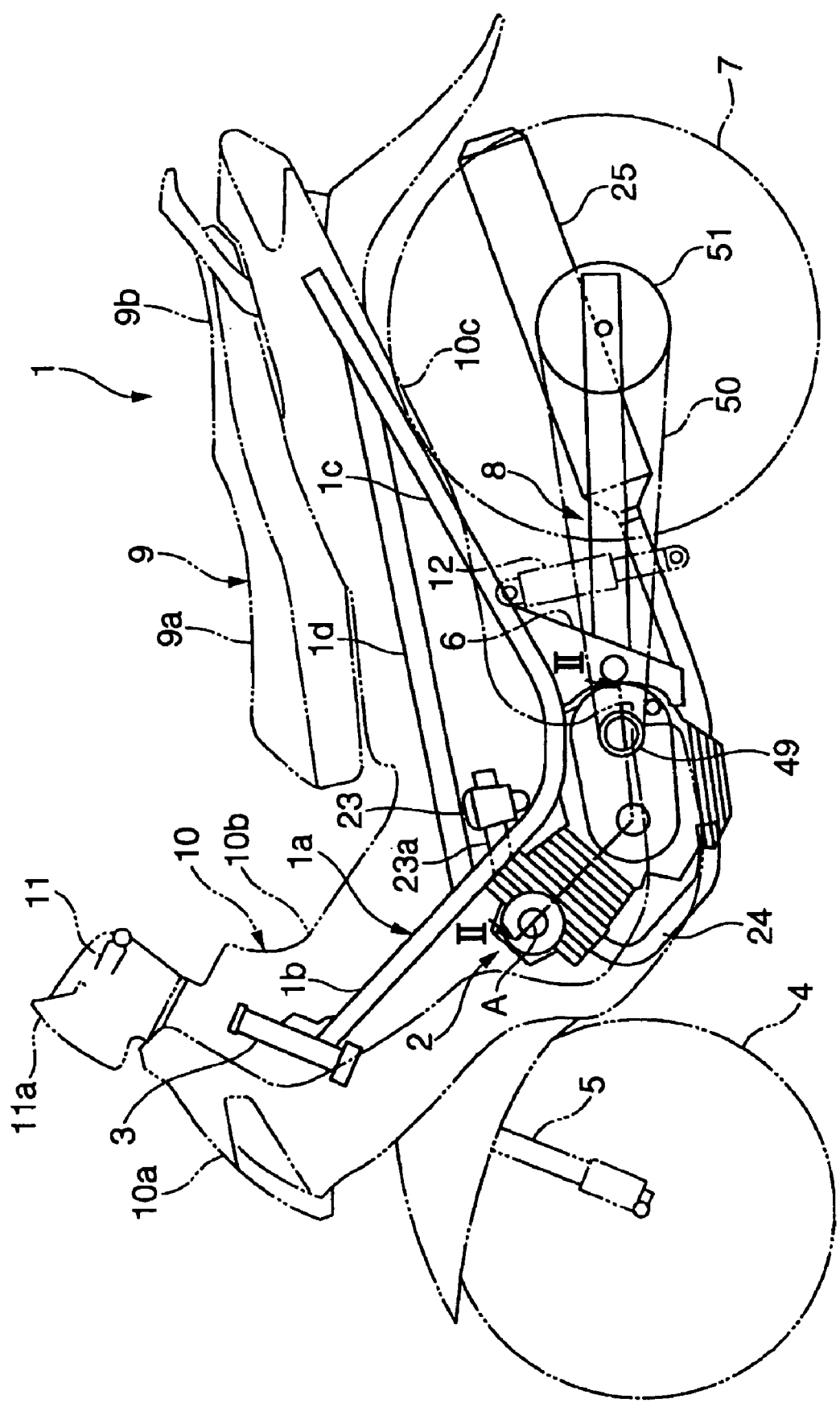
FIG. 1 is a left side view of a motorcycle having an engine and continuously variable transmission combination that is arranged and configured in accordance with certain features, aspects and advantages of the present invention.

With respect to the illustrated embodiments, as used herein, front/forward, rear/rearward, left and right have been used in the following description with a frame of reference of a rider seated on the illustrated vehicle. Also, while multiple embodiments are shown in the figures, like reference numerals will be used to refer to like components from embodiment to embodiment and further description in later embodiments of components described with respect to earlier embodiments will be limited.

With reference now to FIG. 1, a motorcycle 1 is illustrated on which is mounted an engine and continuously variable transmission combination, which has been arranged and configured in accordance with certain features, aspects and advantages of the present invention. While the motorcycle 1 is one type of vehicle with which certain features, aspects and advantages of the present invention have particular utility, the present invention also can find utility with other vehicles in which a compact engine and transmission configuration would be desirably. For instance, certain features, aspects and advantages of the present invention may be useful with snowmobiles, small four wheeled and three wheeled vehicles, golf cars, personal watercraft, buggies, scooters, and the like.

With continued reference to FIG. 1, the motorcycle comprises a front fork 5. The front fork supports an axle of a front wheel 4. The front fork preferably is pivotally supported by a head pipe 3. The head pipe can be secured to a forward end of a vehicle frame 1a. When supported in this manner, the front fork 5 is capable of pivotal movement to the right and left.

A rear arm 8 preferably supports an axle of a rear wheel 7. The rear arm 8 can be pivotally supported by a rear arm bracket 6, which can be secured to a central or rearward portion of the frame 1a. Thus, the rear wheel 7 can swing in the up-and-down direction.

In the illustrated configuration, the motorcycle 1 also comprises a seat 9. The seat preferably has a saddle configuration. In the illustrated configuration, the seat 9 comprises a driver seat portion 9a and a tandem passenger seat portion 9b. Other configurations also can be used. The seat can be mounted on an upper portion of the vehicle frame 1a.

With continued reference to FIG. 1, the vehicle frame 1a preferably comprises right and left down tubes 1b that extend downwardly in a rearward direction from the head pipe 3. Right and left upper tubes 1c preferably extend upwardly in a rearward direction from the respective right and left down tubes 1b. In the illustrated configuration, right and left seat rails 1d are joined to the down tubes 1b and to the upper tubes 1c. The right and left seat rails 1d preferably extend generally horizontally but other configurations also The vehicle frame 1a preferably is covered with body panels 10. The body panels 10 can be formed of plastic, metal, carbon fiber or any other suitable matter. The body panels 10 can comprise, for example but without limitation, a front cover 10a, a leg shield 10b, and side covers 10c.

Handlebars 11, which can be covered with a steering bar cover 11a, are secured to the upper end of the illustrated front fork 5. The handlebars 11 can be used by operators of the vehicle to direct the vehicle along a desired course. A rear cushion, damper or shock absorber 12 can be used to control pivotal movement of the rear arm. In one configuration, the shock absorber 12 extends between the rear arm 8 and the rear arm bracket 6.

An engine unit 2 is mounted to the frame 1a. In the illustrated configuration, the engine unit 2 is mounted to the down tubes 1b. Any suitable engine mounted configuration can be used. The engine unit 2 preferably is mounted such that a drive shaft of the engine unit 2 is positioned rearward of a crankshaft of the engine unit 2 and such that the location about which the rear arm 8 pivots relative to the frame 1a is proximate the drive shaft of the engine unit 2.

Figure 2:
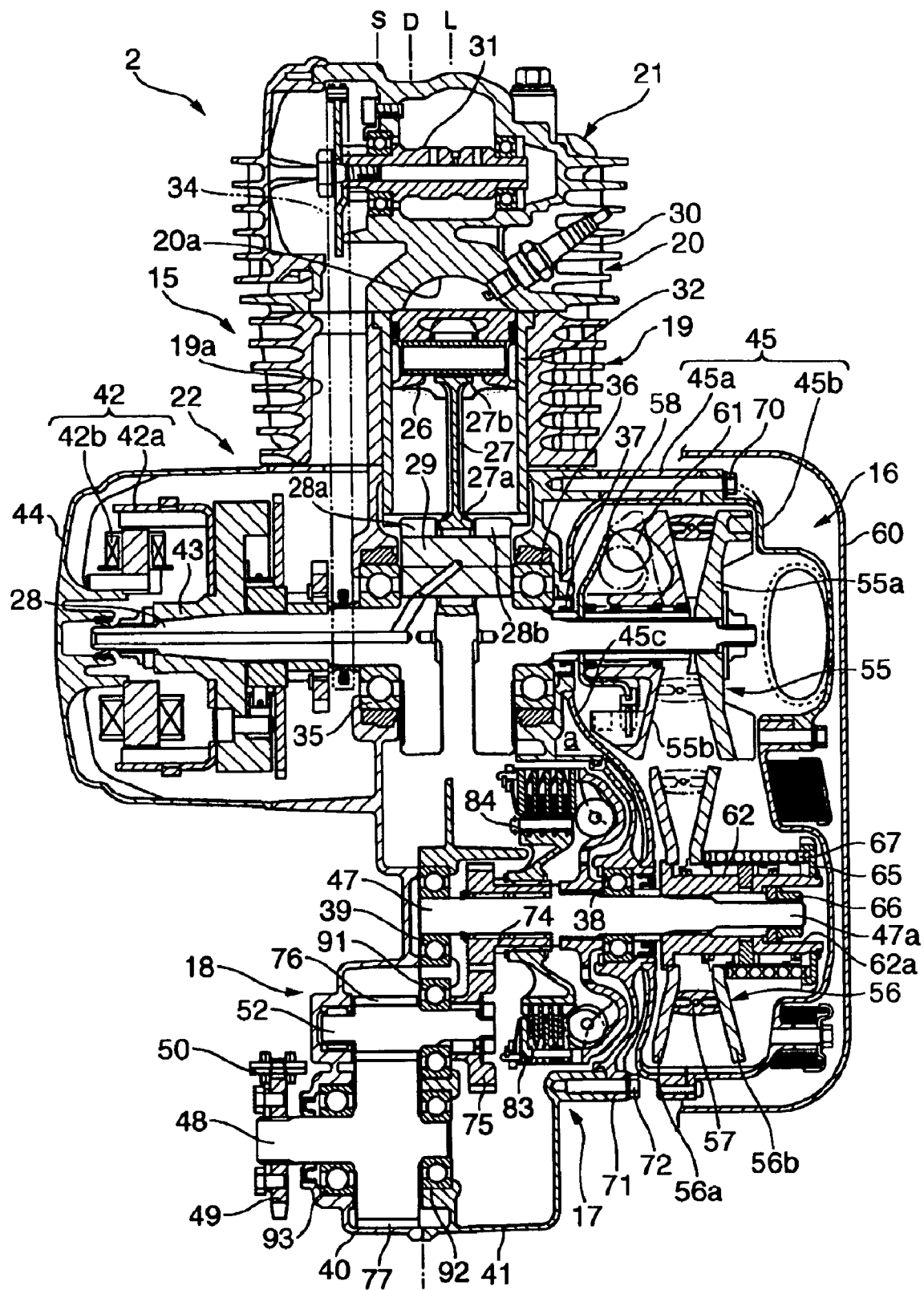
FIG. 2 is a sectioned view taken along the line II-II in FIG. 1.
Figure 3:
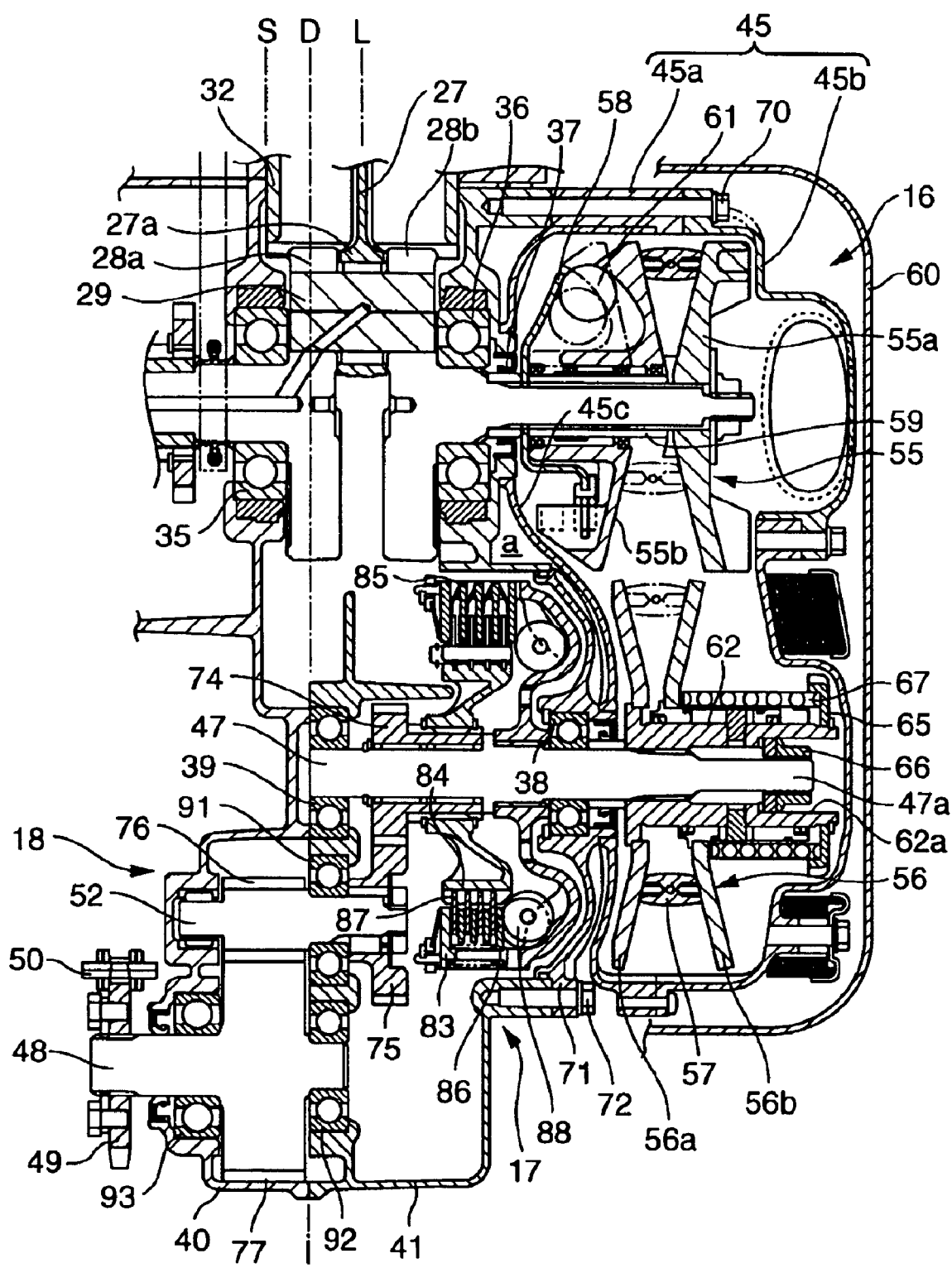
FIG. 3 is an enlarged sectioned view of a portion of a crankcase shown in FIG. 2.

With reference now to FIGS. 1 to 3, the illustrated engine unit 2 comprises an air-cooled 4-cycle single cylinder engine 15 mounted with its cylinder axis A, which extends through a cylinder of a cylinder block 19, inclined at an angle of about 45 degrees (as indicated by the angle α). Other engine configurations also can be used. The engine unit 2 also comprises a continuously variable transmission 16. In the illustrated configuration, the continuously variable transmission comprises a V-belt arrangement but other types of transmissions also can be used. The illustrated engine unit 2 also comprises a wet-type multi-plate centrifugal clutch mechanism 17 and a reduction gear mechanism 18.

As illustrated in FIG. 2, the engine 15 comprises a cylinder head 20 is connected to an upper surface of the illustrated cylinder block 19. A head cover 21 can be provided on the upper side of the cylinder head 20 and a crankcase 22 can be connected to the lower surface of the cylinder block 19. In the illustrated configuration, the crankcase 22 supports a crankshaft 28 and a transmission shaft 47.

An intake port (not shown) preferably extends through a rear surface of the cylinder head 20. The intake port (not shown) can communicate with a combustion chamber defined by a recess 20a formed in the cylinder head 20. A carburetor 23 can be connected to the intake port through an intake pipe 23a. In some configurations, the engine 15 can feature fuel injection (direct, indirect or both), either as an alternative to the carburetor or in combination with the carburetor.

An exhaust port (not shown) preferably extends through a front surface of the cylinder head 20. The exhaust port (not shown) can communicate with the recess 20a in the cylinder head. An exhaust pipe 24 can be connected to the exhaust port (not shown). The exhaust pipe 24 preferably extends generally rearward and downward of the engine 15. The illustrated exhaust pipe also extends toward and alongside the right side of the engine 15 in the illustrated configuration. Other configurations also can be used. The exhaust pipe 24 can be connected to a muffler 25, which is arranged on a right side of the rear wheel 7 in the illustrated configuration.

A spark plug 30 preferably is positioned within the recess 20a. The spark plug 30 can be used to ignite an air/fuel charge that is provided to the recess 20a through the intake port (not shown) or the like. Other configurations (e.g., glow plugs) also can be used.

In the illustrated arrangement, a chain chamber 19a extends along the left side portion of the cylinder block 19. The chain chamber 19a preferably passes through the crank case 22 and the cylinder head 20. A timing chain 34 can be positioned in the chain chamber 19a to drive a cam shaft 31 from rotation of a crankshaft 28. An intake valve (not shown) and an exhaust valve (not shown) can be opened and closed by the cam shaft 31. Other suitable configurations also can be used to open and close ports to the combustion chamber of the engine 15.

The cylinder block 19 defines a cylinder bore. The cylinder bore contains a piston 26. The piston translates within the cylinder bore. One or more cylinder bores and associated pistons 26 can be used. A small end 27b of a connecting rod 27 is coupled to the piston 26 and a large end 27a of the connecting rod 27 is coupled to a crank pin 29. The crank pin 29 preferably is inserted into a gap between, and coupled to, a first web 28a and a second web 28b of the crankshaft 28.

In the illustrated configuration, the crankcase 22 comprises a first case portion 40 and a second case portion 41.

The two case portions 40, 41 each comprise a juncture D of corresponding mating surfaces that preferably extends generally parallel with a generally longitudinal plane L that extends through an axis of the cylinder block 19. The mating surfaces of the two case portions 40, 41 more preferably are offset in one direction from the generally longitudinal plane through the axis L. Even more preferably, the mating surfaces of the two case portions 40, 41 are offset to the left from the longitudinal plane that extends through the axis L. Further, the junction D can be positioned to the right side of a generally longitudinal plane S that extends along the outer diameter of the cylinder sleeve 32. That is, the juncture D preferably is positioned to the left side of the generally longitudinal plane L and to the right side of the generally longitudinal plate S. More preferably, the juncture D is positioned about half way between the plane L and the plane S. In this manner, the internal volume of the illustrated second case portion 41 is larger than the internal volume of the illustrated first case portion 40.

With continued reference to FIG. 2 and FIG. 3, the second case portion 41 comprises a removable case cover 71. The case cover 71 generally seals an opening 41e that is formed in the right side of the second case portion 41. The case cover 71 can be removably secured to the second case portion 41 with threaded fasteners 72, such as bolts or the like. When the case cover 71 is removed from the second case portion 41, the centrifugal clutch mechanism 17 can be removed from the chamber defined by the case cover 71, as can be the associated transmission shaft 47.

In the illustrated configuration, a generator case 44 can be provided on the front left side of the first case portion 40 to at least partially define a generator chamber. The generator case 44 is shown in the upper left side in FIGS. 2 and 3. The generator case 44 preferably is removably attached to the first case portion 40 in the illustrated configuration. The generator case 44 preferably overlies a generator 42 that is positioned within the generator chamber. On the right side of the second case portion 41, a transmission case 45 can be connected to generally enclose the continuously variable transmission 16 within a transmission chamber defined, at least in part, by the transmission case 45. Either or both of the generator case 44 and the transmission case 45 can be integrally formed with the crankcase 22, but by making the cases 44, 45 removable in the illustrated configuration, the cases 44, 45 can be removed to improve serviceability of the underlying components.

As illustrated, the transmission case 45 preferably is formed independently of the crank case 22. The illustrated transmission case comprises a box-like case body 45a. The case body 45a preferably has an opening that is disposed outside of the second case 41. The transmission case 45 also comprises a closure 45b that substantially or completely closes the opening of the case body 45a. In one configuration, both the case body 45a and the closure 45b are secured to the second case portion 41 by bolts 70. Other techniques for attaching the case body 45a and the closure 45b, either separately or together, can be used.

In the illustrated configuration, a gap indicated by the reference letter "a" preferably is formed between a wall 45c of the case body 45a and the second case portion 41 to reduce the heat transfer into the transmission case 45 from the engine 15. A face cover 60 also can be provided that protects the transmission case 45 as well as that improves the aesthetics of the associated vehicle.

The crankshaft 28 preferably is positioned on the front side of the crankcase 22. As illustrated, the crankshaft 28 can be mounted using bearings. Preferably, on the left side of the plane L, the crankshaft 28 is journaled relative to the left end surface of the second case portion 41 by a bearing 35 and, and on the right side of the plane L, the crankshaft 28 is journaled relative to the right end surface of the second case portion 41 by another bearing 36.

In one configuration, the right end of the crankshaft 28 extends beyond the second case portion 41 into the transmission case 45. A drive pulley 55 of the continuously variable transmission 16 can be mounted to the right end of the crankshaft 28. In one advantageous configuration, a sealing member 37 can be provided in a portion where the crankshaft 28 extends beyond the right end surface of the second case portion 41 and the wall 45c of the transmission case 45. Preferably, in such a configuration, the transmission case 45 is hermetically closed with respect to the second case portion 41. By sealing the transmission case, the clutch mechanism enclosed in the second case portion 41 can include a wet multi-plate type of clutch.

Preferably, the left end of the crankshaft 28 extends beyond the first case portion 40 into the generator case 44. The generator 42 can be mounted on the left end of the crankshaft 28. In other words, the connecting rod 27 is connected to the crankshaft 28 between the generator 42 and the drive pulley 55 of the continuously variable transmission 16. In one configuration, the generator 42 comprises a rotor 42a that is secured to a sleeve 43 and the sleeve is taper-fit to the crankshaft 28. The generator also can comprise a stator 42b that facing the rotor 42a. The stator 42b can be secured to the generator case 44. Other configurations also can be used.

A transmission shaft 47 preferably is arranged in parallel with the crankshaft 28. In the illustrated configuration, the transmission shaft 47 is positioned on the rear side of the illustrated crankcase 22. The transmission shaft 47 can be supported by bearings 38, 39. Preferably, the transmission shaft 47 is journaled relative to the case cover 71 by the bearing 38. The bearing 38 is positioned on the right side of the plane L of the cylinder block 19. The bearing 39 preferably is positioned on the left side of the plane L. The bearing 39 journals the transmission shaft relative to the left end surface of the second case portion 41.

While the left end of the transmission shaft 47 can be supported by the first case 40 and the second case 41 can be interposed between the case cover 71 and the first case 40, but such a configuration reduces the support precision of the transmission shaft 47. The transmission shaft 47 may be worn out more rapidly and experience a decrease in durability and reliability as a result of this reduced precision. Thus, the illustrated configuration, which supports the left end of the transmission shaft 47 with the second case portion 41, improves the reliability and durability of the transmission 16. Moreover, the illustrated configuration maintains the serviceability of the clutch.

The right end of the transmission shaft 47 preferably extends into the transmission case 45 beyond the second case 41. A driven pulley 56 of the continuously variable transmission 16 can be attached to the right end of the transmission shaft 47. Preferably, the centrifugal clutch mechanism 17 also is mounted on the transmission shaft 47. The centrifugal clutch mechanism 17 can be mounted to the transmission shaft or can be positioned separate of the transmission shaft, keeping in mind the desire for a compact construction, which likely features an aligned transmission shaft 47 and centrifugal clutch mechanism 17. In the illustrated configuration, the centrifugal clutch mechanism 17 is positioned on one end portion of the transmission shaft 47 while the driven pulley 56 is positioned on the other end portion of the transmission shaft 47. Therefore, the illustrated centrifugal clutch mechanism 17 is arranged between the driven pulley 56 of the continuously variable transmission 16 and the plane L. Advantageously, the centrifugal clutch mechanism 17 and the transmission shaft 47 are generally axially aligned and the engine 15 features a more compact construction. The illustrated configuration (i.e., the centrifugal clutch mechanism 17 being arranged laterally inward of the continuously variable transmission) is possible, in part, due to the juncture D of the crankcase 22 that is offset to the left side of the plane L of the cylinder block 19, which widens the space in the second case portion 41.

In the illustrated configuration, the centrifugal clutch mechanism 17 comprises the wet multi-plate type. Such a clutch mechanism 17 generally comprises spline-fitting a cup-shaped outer clutch mechanism 83 to the transmission shaft 47 such that the clutch mechanism 83 and the transmission shaft 47 will rotate together. Moreover, such a clutch mechanism also generally comprises generally concentrically arranging an inner clutch mechanism 84 on the inside of the outer clutch mechanism 83 in the axial direction. The inner clutch mechanism 84 preferably is spline-fit to a small primary reduction gear 74 that is secured on the transmission shaft 47 such that the transmission shaft 47 and the primary reduction gear 74 will rotate together.

A plurality of outer clutch plates 85 can be arranged in the outer clutch mechanism 83 and a pushing plate 86 can be arranged at the end of the outer clutch mechanism 83. The outer clutch plates 85 and the pushing plate 86 can engage the outer clutch mechanism 83 so as to rotate together with the outer clutch mechanism 83. Further, inner clutch plates 87 are arranged among the outer clutch plates 85 and the pushing plate 86. The inner clutch plates 87 are engaged with the outer periphery of the inner clutch mechanism 84 so as to rotate together with the inner clutch mechanism 84.

A cam surface 83a is formed on the inner side of the outer clutch mechanism 83 and a weight 88 is arranged between the cam surface 83a and the pushing plate 86. The weight 88 moves outward in the radial direction along the cam surface 83a due to centrifugal forces created on the weight 88, i.e., the weight 88 moves in a direction in which the clutch mechanism is connected, whereby the pushing plate 86 are moved in a manner that results in the outer clutch plates 85 and the inner clutch plates 87 being squeezed together. In the figures, the upper weight 88 is shown in a disengaged position while the lower weight 88 is shown in an engaged position.

The continuously variable transmission 16 generally comprises the drive pulley 55, which is mounted on the right end of the crankshaft 28 in the illustrated embodiment, the driven pulley 56, which is mounted on the right end of the transmission shaft 47 in the illustrated embodiment, and the V-belt 57 that is wrapped round the drive pulley 55 and the driven pulley 56. While the illustrated configuration uses a V-belt, other flexible transmitters also can be used, such as but not limited to, steels belts, segmented belts, rubber belts, cables, rings, loops and the like.

The illustrated continuously variable transmission 16 will now be described. The drive pulley 55 preferably comprises a drive side fixed sheave 55a and a drive side moveable sheave 55b. The drive side fixed sheave 55a is secured to the right end of the crankshaft 28. A slide collar 59 rotationally secures the drive side moveable sheave 55b to the crankshaft 28 while allowing the moveable sheave 55b to slide axially along the crankshaft. A cam plate 58 is arranged on the left side of the drive side moveable sheave 55b and a suitably shaped weight 61 is arranged between the cam plate 58 and the drive side moveable sheave 55b. In the illustrated configuration, the weight 61 is generally cylindrically shaped.

The driven pulley 56 preferably includes a driven side moveable sheave 56b and a driven side fixed sheave 56a. The moveable sheave 56b is biased by a coil spring 67 and can translate along the transmission shaft 47. Preferably, the moveable sheave 56b is mounted on the right end of the transmission shaft 47 and is secured to the transmission shaft 47 so that the moveable sheave 56b will rotate together with the transmission shaft 47. The driven side fixed sheave 56a can be secured to the transmission shaft 47 in any suitable manner. A collar 62 is used to secure the fixed sheave 56a in the illustrated configuration. The collar 62 can be secured to the fixed sheave 56a and can be spline-fit to the transmission shaft 47. The illustrated collar 62 has a generally cylindrical shape. In the illustrated configuration, the drive side fixed sheave 56a is interposed between the drive side moveable sheave 56b and the centrifugal clutch 17.

As the rotational speed of the crankshaft 28 increases, the weight 61 of the drive pulley 55 in the continuously variable transmission 16 moves radially outward due to the centrifugal force of the weight 61. The movement of the weight 61 causes the drive side moveable sheave 55b to move in the axial direction toward the fixed sheave 55a. Due to this movement, the V-belt wrapping diameter of the drive pulley 55 increases. Therefore, the driven side moveable sheave 56b moves in the axial direction away from the fixed sheave 56a, which compresses the coil spring 67. The axial movement of the moveable sheave 56b causes the wrapping diameter of the driven pulley 56 to decrease. Hence, the reduction ratio decreases as the speed of the crankshaft 28 increases. As the rotational speed of the crankshaft 28 decreases, the weight 61 moves radially inward which allows the drive side moveable sheave 55b to move axially away from the fixed sheave 55a. Therefore, the driven side moveable sheave 56b moves axially toward the fixed sheave 56a under the biasing force of the coil spring 67. Hence, the wrapping diameter of the driven pulley 56 increases, the wrapping diameter of the drive pulley 55 decreases and, as a result, the reduction ratio increases as the speed of the crankshaft 28 decreases.

As illustrated, the driven pulley 56 can be secured to the transmission shaft 47 by a lock nut 66. The lock nut 66 can be screwed onto the end of the transmission shaft 47. The lock nut 66 preferably is submerged in the right end 62a of the collar 62. Accordingly, the inner diameter of the collar 62 preferably comprises an enlarged portion that is larger than the outer diameter of the transmission shaft 47. More preferably, a right end 47a of the illustrated transmission shaft 47 has a stepped configuration featuring a diameter which is decreased relative to the main portion of the transmission shaft 47. Such a constitution enables the lock nut 66 to be easily inserted in the right end 62a of the collar 62.

As illustrated, the coil spring 67 seats on a spring-receiving member 65. Due to the nut 66 being received within the collar 62, the overall length associated with the transmission shaft 47 can be decreased and the collar 62 and nut 66 need not extend an excessive distance outward of the driven pulley 56. Thus, in the illustrated configuration, the components associated with the driven pulley 56 extend outward only a sufficient distance to provide sufficient space to accommodate the spring 67.

With reference to FIG. 3, the reduction gear mechanism 18 comprises a reduction shaft 52 that extends generally parallel with the transmission shaft 47. A large primary reduction gear 75 can be coupled to the reduction shaft 52. The large primary reduction gear 75 meshes with a small primary reduction gear 74. The small primary reduction gear 74 is counted to the transmission shaft 47. A small secondary reduction gear 76 can be integrally formed on the reduction shaft 52. The small secondary reduction gear 76 meshes with a large secondary reduction gear 77. The large secondary reduction gear 77 preferably is integrally formed on the drive shaft 48.

In the illustrated configuration, the right end of the reduction shaft 52 can be secured to the left end surface of the second case portion 41 by a bearing 91. Further, the left end of the reduction shaft 52 can be rotatably secured to the left end surface of the first case 40.

A drive shaft 48 preferably is arranged in parallel with the reduction shaft 52. More particularly, in the illustrated configuration, the drive shaft 48 is formed separately of, and spaced apart from, the transmission shaft 47. Preferably, a bearing 92 can secure the right end of the drive shaft 48 to the left end surface of the second case portion 41. In addition, another bearing 93 can secure the left end of the drive shaft 48 to the left end surface of the first case portion 40. Further, a sprocket 49 can be attached to the drive shaft 48. In the illustrated embodiment, the sprocket 49 is attached to the ultimate left end of the drive shaft 48. The sprocket 49 can be connected to a driven sprocket 51 associated with the rear wheel 7 by a chain 50.

Figure 4:
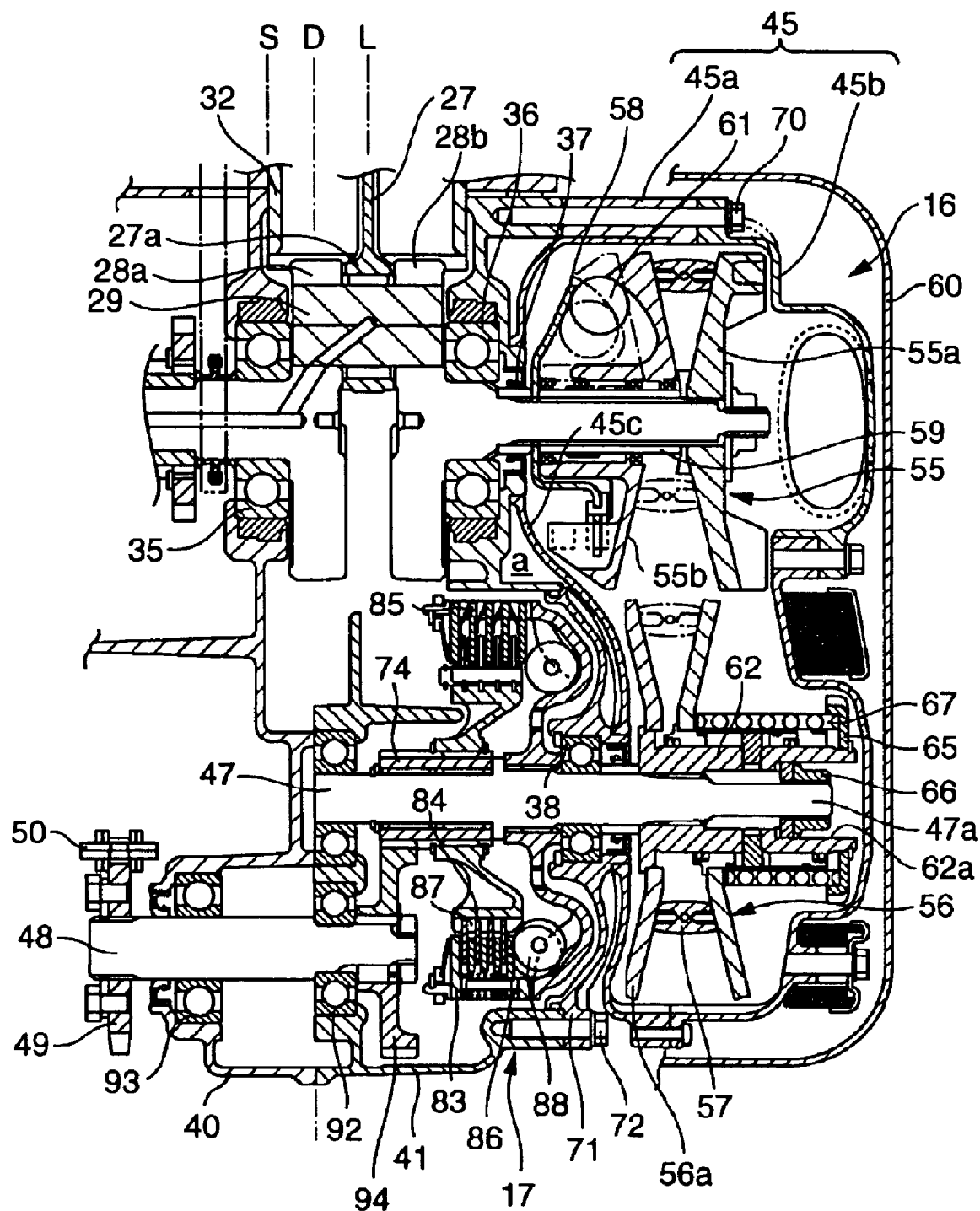
FIG. 4 is an enlarged sectioned view similar to FIG. 3 but showing another combination that is arranged and configured in accordance with certain features, aspects and advantages of the present invention.

With reference now to FIG. 4, the rotation of the transmission shaft 47 can be output from the engine and transmission combination through other gearing configurations. As illustrated by the embodiment of FIG. 4, a large reduction gear 94 may be mounted on the drive shaft 48 and may mesh with the small primary reduction gear 74 instead of using the reduction shaft 52 and the large primary reduction gear 75 illustrated in FIG. 2. In the arrangement of FIG. 4, the crankshaft 28 preferably rotates in an opposite direction relative to the arrangement of FIG. 2.

Figure 5:
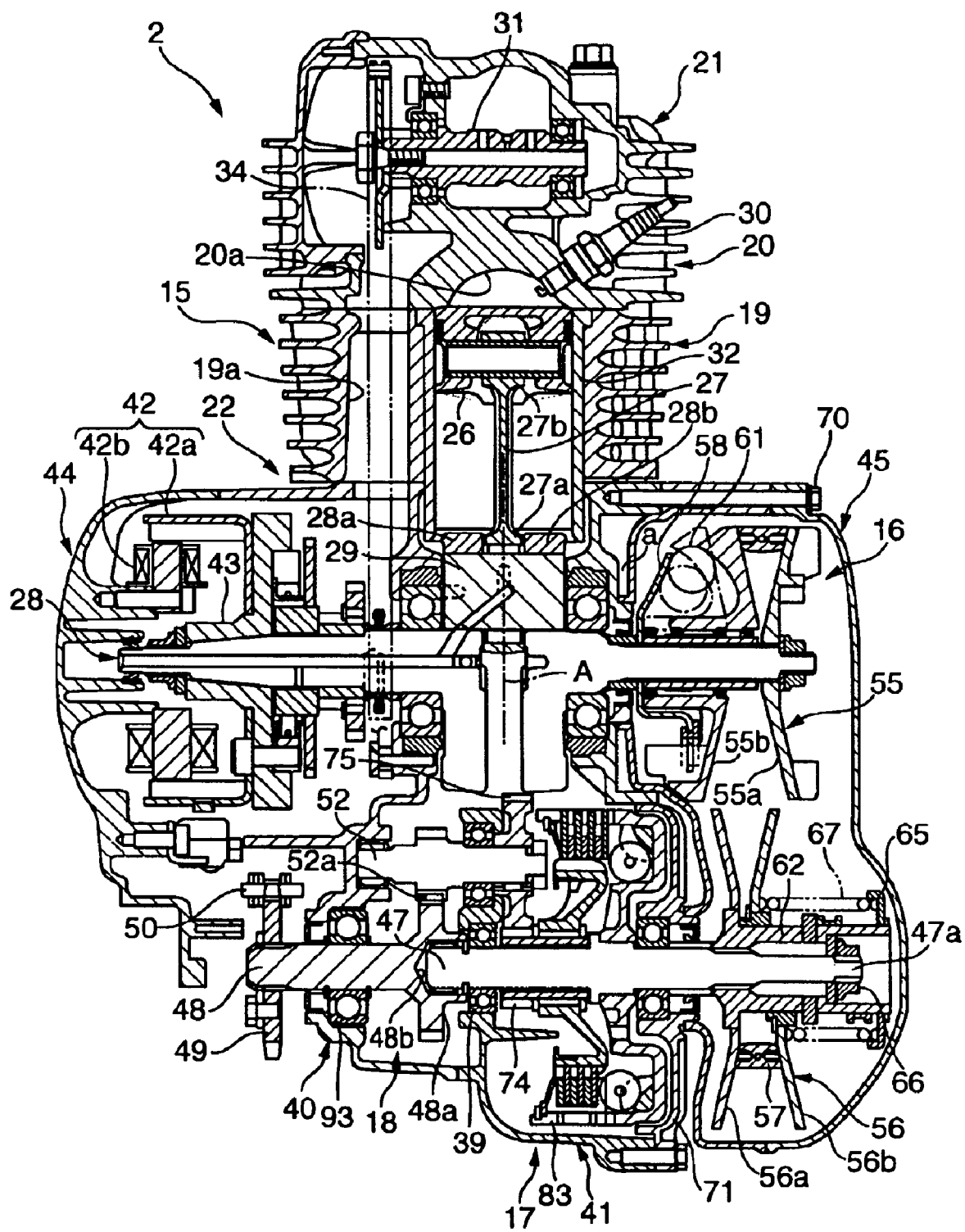
FIG. 5 is a sectioned view similar to FIG. 2 but showing a further combination that is arranged and configured in accordance with certain features, aspects and advantages of the present invention.

With reference now to FIG. 5, another configuration that is arranged and configured in accordance with certain features, aspects and advantages of the present invention is illustrated therein. In the arrangement of FIG. 5, on the left side of the transmission shaft 47, the drive shaft 48 can be formed separate of, but can be generally aligned with, the transmission shaft 47. In such a configuration, the reduction shaft 52 can be arranged generally forward of the transmission shaft 47. Preferably, the reduction shaft 52 extends generally parallel with the transmission shaft and the large primary reduction gear 75 is coupled to the reduction shaft. The large primary reduction gear 75 preferably meshes with the small primary reduction gear 74, which is coupled to the transmission shaft 47. In the illustrated configuration, the reduction shaft 52 also has the small secondary reduction gear 52a formed integrally therewith. In some configurations, the small secondary reduction gear 52a can be formed separate of the reduction shaft 52 and secured thereto. The drive shaft 48 preferably comprises the large secondary reduction gear 48a. In the illustrated configuration, the large secondary reduction gear 48a is formed integrally with the drive shaft 48 but, in some configurations, the large secondary reduction gear 48a can be formed separately of the drive shaft 48 and secured thereto in any suitable manner.

Although the present invention has been described in terms of certain embodiments, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. An engine and continuously variable transmission combination, the combination comprising a case and a cylinder extending away from the case, the cylinder comprising an axis the case supporting a crankshaft and a transmission shaft, a first longitudinal plane extending along the axis of the cylinder and extending perpendicular to an axis of the crankshaft, the case comprising a first portion and a second portion, the first portion and the second portion being separable along a second longitudinal plane that is generally parallel to the first longitudinal plane, a drive pulley being attached to a first end of the crankshaft, the drive pulley being coupled with a flexible transmitter to a driven pulley, the driven pulley being attached to a first end of the transmission shaft, a clutch mechanism being generally axially aligned with the shaft, the clutch mechanism being positioned toward the first longitudinal plane relative to the driven pulley, and the first longitudinal plane being positioned between the second longitudinal plane and the driven pulley.

2. The combination of claim 1, wherein the engine includes only one cylinder.

3. The combination of claim 2, wherein the clutch mechanism is mounted to the transmission shaft.

4. The combination of claim 1, wherein a sleeve is positioned within the cylinder and the second longitudinal plane is offset from the first longitudinal plane by a distance less than or equal to about one-half of an outer diameter of the sleeve.

5. The combination of claim 4, wherein the clutch mechanism is mounted to the transmission shaft.

6. The combination of claim 1, wherein the clutch mechanism is mounted to the transmission shaft.

7. The combination of claim 6 further comprising a drive shaft that outputs power from the combination, the drive shaft comprising a rotational axis that is offset from a rotational axis of the transmission shaft.

8. The combination of claim 1, wherein the clutch mechanism is isolated from the continuously variable transmission such that fluid from the clutch mechanism is substantially prevented from passing to the continuously variable transmission.

9. The combination of claim 8, wherein at least one wall of the case defines an opening, a cover substantially closing the opening, the opening being sized and positioned to allow the clutch mechanism to be removed from the combination when the cover is removed and the cover forming a substantially liquid-tight closure over the opening.

10. The combination of claim 9 further comprising a drive shaft that outputs power from the combination, the drive shaft comprising a rotational axis that is offset from a rotational axis of the transmission shaft.

11. The combination of claim 8, wherein the clutch mechanism comprises a wet-type clutch mechanism.

12. The combination of claim 11 further comprising a drive shaft that outputs power from the combination, the drive shaft comprising a rotational axis that is offset from a rotational axis of the transmission shaft.

13. The combination of claim 11, wherein at least one wall of the case defines an opening, a cover substantially closing the opening, the opening being sized and positioned to allow the clutch mechanism to be removed from the combination when the cover is removed and the cover forming a substantially liquid-tight closure over the opening.

14. The combination of claim 13 further comprising a drive shaft that outputs power from the combination, the drive shaft comprising a rotational axis that is offset from a rotational axis of the transmission shaft.

15. The combination of claim 13, wherein the cover supports a bearing and the bearing supports the transmission shaft proximate the driven pulley.

16. The combination of claim 13 further comprising a drive shaft that outputs power from the combination, the drive shaft comprising a rotational axis that is offset from a rotational axis of the transmission shaft.

17. The combination of claim 1 further comprising a drive shaft that outputs power from the combination, the drive shaft comprising a rotational axis that is offset from a rotational axis of the transmission shaft.

* * * * *

UNITED STATES PATENT AND TRADEMARK OFFICE
CERTIFICATE OF CORRECTION

PATENT NO. : 7,311,623 B2
APPLICATION NO. : 11/305353
DATED : December 25, 2007
INVENTOR(S) : Tatsuya Masuda et al.

It is certified that error appears in the above-identified patent and that said Letters Patent is hereby corrected as shown below:

On the Title page at column 1 (Inventors), line 1, after "Iwata" insert
-- , Shizuoka-ken, --.

On the Title page at column 1 (Inventors), line 2, after "Iwata" insert
-- , Shizuoka-ken, --.

On the Title page at column 1 item (63); (Related U.S. Application Data), line 1, delete "PCT/JP04/06330," and insert -- PCT/JP2004/008330, --, therefor.

At column 10, line 19, in Claim 1, before "shaft," insert -- transmission --.

At column 10, line 21, in Claim 1, after "pulley" delete ", and" and insert -- and between the driven pulley and the second longitudinal plane, and --, therefor.

Signed and Sealed this

Second Day of September, 2008

JON W. DUDAS
*Director of the United States Patent and Trademark Office*

UNITED STATES PATENT AND TRADEMARK OFFICE
CERTIFICATE OF CORRECTION

PATENT NO. : 7,311,623 B2
APPLICATION NO. : 11/305353
DATED : December 25, 2007
INVENTOR(S) : Tatsuya Masuda et al.

It is certified that error appears in the above-identified patent and that said Letters Patent is hereby corrected as shown below:

At column 10, Line 8, Claim 1; after "axis" please add --,--.

Signed and Sealed this

Twenty-fourth Day of November, 2009

David J. Kappos
*Director of the United States Patent and Trademark Office*